US011395269B2

(12) United States Patent
Baldemair et al.

(10) Patent No.: US 11,395,269 B2
(45) Date of Patent: Jul. 19, 2022

(54) CODE RATE FOR CONTROL INFORMATION

(71) Applicant: Telefonaktiebolaget LM Ericsson (publ), Stockholm (SE)

(72) Inventors: Robert Baldemair, Solna (SE); Daniel Chen Larsson, Lund (SE); Sorour Falahati, Stockholm (SE); Fredrik Lindqvist, Järfälla (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 74 days.

(21) Appl. No.: 16/339,997

(22) PCT Filed: Aug. 11, 2017

(86) PCT No.: PCT/SE2017/050817
§ 371 (c)(1),
(2) Date: Apr. 5, 2019

(87) PCT Pub. No.: WO2019/031998
PCT Pub. Date: Feb. 14, 2019

(65) Prior Publication Data
US 2020/0045689 A1   Feb. 6, 2020

(51) Int. Cl.
*H04W 72/04* (2009.01)
*H04L 1/00* (2006.01)
(Continued)

(52) U.S. Cl.
CPC ....... *H04W 72/0413* (2013.01); *H04L 1/0057* (2013.01); *H04L 1/0073* (2013.01);
(Continued)

(58) Field of Classification Search
CPC ......... H04W 72/0413; H04W 72/0453; H04W 72/0446; H04W 72/1284; H04L 1/0057;
(Continued)

(56) References Cited

U.S. PATENT DOCUMENTS 9,876,623 B2 *   1/2018   Papasakellariou ...... H04L 5/001
10,666,413 B2 *   5/2020   Papasakellariou .... H04L 5/0057
(Continued)

FOREIGN PATENT DOCUMENTS

EP    2760171 A2    7/2014
WO   2011085230 A2   4/2011
(Continued)

OTHER PUBLICATIONS

International Search Report and Written Opinion dated May 17, 2018 for International Application No. PCT/SE2017/050817 filed on Aug. 11, 2017, consisting of 8-pages.
(Continued)

*Primary Examiner* — Brian T O Connor
(74) *Attorney, Agent, or Firm* — Christopher & Weisberg, P.A.

(57) ABSTRACT

There is disclosed a method of operating a user equipment in a radio access network. The method includes transmitting feedback control signaling, the feedback control signaling representing a number I of information bits, the I information bits being encoded with a code rate based on a code rate indication. The disclosure also pertains to related devices and methods.

18 Claims, 5 Drawing Sheets

Example: 14 symbols Long PUCCH, 2 DMRS symbols, Frequency hopping

(51) Int. Cl.
  *H04L 5/00* (2006.01)
  *H04W 72/12* (2009.01)
  *H04L 1/16* (2006.01)

(52) U.S. Cl.
  CPC .......... *H04L 5/0055* (2013.01); *H04L 5/0057* (2013.01); *H04W 72/0446* (2013.01); *H04W 72/0453* (2013.01); *H04W 72/1284* (2013.01); *H04L 1/0026* (2013.01); *H04L 1/1607* (2013.01)

(58) Field of Classification Search
  CPC ... H04L 5/0057; H04L 1/0073; H04L 5/0055; H04L 1/0026; H04L 1/1607
  See application file for complete search history.

(56) References Cited

U.S. PATENT DOCUMENTS

| | | | | |
|---|---|---|---|---|
| 10,680,786 | B2* | 6/2020 | Suzuki | H04W 72/12 |
| 10,708,938 | B2* | 7/2020 | Papasakellariou | H04L 5/0094 |
| 10,798,688 | B2* | 10/2020 | Baldemair | H04L 1/0073 |
| 11,005,549 | B2* | 5/2021 | Hosseini | H04L 1/1861 |
| 2012/0039279 | A1 | 2/2012 | Chen et al. | |
| 2015/0110016 | A1 | 4/2015 | Kim et al. | |
| 2015/0372740 | A1 | 12/2015 | Ko et al. | |
| 2016/0183212 | A1 | 6/2016 | Suzuki et al. | |
| 2016/0183244 | A1* | 6/2016 | Papasakellariou | H04L 5/0057 370/329 |
| 2016/0294531 | A1 | 10/2016 | Loehr et al. | |
| 2017/0163388 | A1 | 6/2017 | Wiemann | |
| 2017/0302346 | A1 | 10/2017 | Jeong | |
| 2018/0083750 | A1* | 3/2018 | Li | H04L 1/1819 |
| 2018/0124815 | A1 | 5/2018 | Papasakellariou | |
| 2018/0248671 | A1* | 8/2018 | Bhattad | H04L 1/0068 |
| 2019/0036585 | A1* | 1/2019 | Hosseini | H04W 72/042 |
| 2019/0075548 | A1* | 3/2019 | Lee | H04W 52/383 |
| 2019/0280842 | A1* | 9/2019 | Suzuki | H04L 1/18 |
| 2019/0387578 | A1* | 12/2019 | Shrestha | H04W 72/14 |
| 2020/0068609 | A1* | 2/2020 | Wang | H04W 72/0446 |
| 2021/0013901 | A1* | 1/2021 | Li | H03M 13/116 |

FOREIGN PATENT DOCUMENTS

| | | |
|---|---|---|
| WO | 2016182406 A1 | 11/2016 |
| WO | 2017078603 A1 | 5/2017 |

OTHER PUBLICATIONS

International Search Report and Written Opinion dated Jun. 15, 2018 for International Application No. PCT/SE2018/050349 filed on Apr. 3, 2018, consisting of 11-pages.

3GPP TSG RAN WG1 meeting #62bis R1-105123; Title: Simultaneous transmission of CQI and ACK/NACK; Agenda Item: 6.2.1.3; Source: Huawei, HiSilicon; Document for: Discussion/Decision; Location and Date: Xi'an China, Oct. 11-15, 2010, consisting of 6-pages.

Office Action dated Sep. 19, 2019 for U.S. Appl. No. 16/356,603, filed Mar. 18, 2019, consisting of 11-pages.

Office Action dated Apr. 2, 2020 for U.S. Appl. No. 16/356,603, filed Mar. 18, 2019, consisting of 12-pages.

U.S. Non-Final Office Action dated Dec. 24, 2021 in U.S. Appl. No. 17/002,467, filed Aug. 25, 2020, consisting of 9 pages.

* cited by examiner

Example: 14 symbols Long PUCCH, 2 DMRS symbols, Frequency hopping

CODE RATE FOR CONTROL INFORMATION

CROSS-REFERENCE TO RELATED APPLICATION

This application is a Submission Under 35 U.S.C. § 371 for U.S. National Stage Patent Application of International Application No: PCT/SE2017/050817, filed Aug. 11, 2017 entitled "CODE RATE FOR CONTROL INFORMATION," the entirety of which is incorporated herein by reference.

TECHNICAL FIELD

This disclosure pertains to wireless communication technology, in particular control signaling.

BACKGROUND

Modern wireless communication systems like 5G system, e.g. New Radio (NR), are developed to handle a large variety of use cases, for example Mobile Broadband (MBB) and low-latency applications. To be able to adapt to highly different demands, new types of control signaling are required.

SUMMARY

It is an object of this disclosure to describe approaches allowing improved and flexible handling of control information, in particular of feedback information, e.g. in uplink or sidelink. The approaches are particularly advantageously implemented in a 5th Generation (5G) telecommunication network or 5G radio access technology or network (RAT/RAN), in particular according to 3GPP (3rd Generation Partnership Project, a standardisation organization). A suitable RAN may in particular be a RAN according to NR or LTE Evolution, for example release 15 or later.

Accordingly, there is disclosed a method of operating a radio node, in particular a user equipment, in a radio access network. The method comprises transmitting feedback control signaling, the feedback control signaling representing a number I of information bits, wherein the I information bits are encoded with a code rate based on a code rate indication.

Moreover, there is disclosed a radio node, in particular a user equipment, for a radio access network. The user equipment is adapted for transmitting feedback control signaling, the feedback control signaling representing a number I of information bits, wherein the I information bits are encoded with a code rate based on a code rate indication. The radio node or user equipment may comprise, and/or be adapted for utilising, processing circuitry and/or radio circuitry, in particular a transceiver and/or transmitter, for such transmitting. Alternatively, or additionally, it may comprise a transmitting module for such transmitting. The radio node may be considered a feedbacking radio node, and may in particular be implemented as a user equipment or terminal. However, in some cases, the radio node may be a network node, e.g. in backhaul communication with another network node like a configuring radio node.

There is also disclosed a method of operating a configuring radio node in a radio access network. The method comprises configuring a feedbacking radio node, in particular a user equipment, with a code rate indication for feedback control signaling, the code rate indication indicating a code rate for encoding information bits of the feedback control signaling. The method may comprise receiving feedback control signaling based on the code rate indication and/or the code rate.

Furthermore, a configuring radio node for a radio access network is considered. The configuring radio node is adapted for configuring a feedbacking radio node, in particular a user equipment, with a code rate indication for feedback control signaling, the code rate indication indicating a code rate for encoding information bits of the feedback control signaling. The configuring radio node may comprise, and/or be adapted for utilising, processing circuitry and/or radio circuitry, in particular a transceiver and/or transmitter, for such configuring. Alternatively, or additionally, it may comprise a transmitting module for such transmitting. The configuring radio node may be implemented as a network node, in particular a base station like an eNB or gNB, or as a user equipment or terminal, for example in sidelink communication with the feedbacking radio node, which may also be a user equipment or terminal. In some variants, the configuring radio node may be adapted for receiving the feedback control signaling based on the code rate indication and/or the code rate. The node may comprise, and/or be adapted for utilising, processing circuitry and/or radio circuitry, in particular a receiver and/or transceiver, and/or a receiving module, for such receiving.

Feedback control signaling may comprise feedback control information, which comprise information of different types, e.g. feedback information and/or acknowledgement information, and/or measurement information (e.g., measurement reporting, and/or channel state or quality information), and/or scheduling request information (e.g., a scheduling request), and/or beam information (e.g., beam-specific feedback). Feedback control signaling may be uplink signaling, or sidelink signaling, or related to backhaul communication. Examples of feedback control signaling comprise signaling carrying uplink control information, in particular UCI, or signaling carrying sidelink control information, in particular SCI. Feedback control information may pertain to specific signaling received, e.g., feedback information, in particular acknowledgement information), which may pertain to specific data streams and/or channels and/or acknowledgement signaling processes. Alternatively, or additionally, feedback control information may pertain to one or more specific channels, in particular physical channels, and/or ports like antenna ports.

The code rate (which may be referred to as coding rate) may generally indicate or represent a ratio between a number I of information bits (representing control information) and a number E of encoded bits, which may be determined based on the information bits, and include and/or represent them. Thus, generally, E>I may be considered to hold, and L=E−I may be considered to represent the error coding bits. The I information bits may be jointly encoded, e.g. in one group or in subgroups. Encoding may be considered to comprise error encoding, in particular error detection coding and/or forward error correction coding. Such encoding may add a number of bits to a given number I to enable error detection and/or correction. Different types of error encoding may be considered, e.g. polar coding or LDPC coding. Note that depending on the error encoding type used, the information bits I may be left untouched, or may be transformed, to be represented in the E encoded bits. E may be considered to represent the total number of bits after encoding, including the representation of the I information bits, plus the error coding bits L, which may be mathematically interwoven. The code rate indication may comprise one or more indicators, which may be provided or obtained together or separately, e.g. in different messages, which may be on the same or different layers, e.g. physical layer (like DCI signaling), MAC or RRC/RLC layer. Generally, the code rate indication may comprise at least one indicator (e.g., a parameter or index of bit field), which may be provided with a configuration, e.g. via DCI signaling or RRC signaling. The code rate may be determined based on the code rate indication, and optionally, be determined based on one or more additionally indications and/or parameters. The code rate may, for example, be determined based on the number I, which may be referred to as payload size (the corresponding information bits may be considered the payload) of the feedback control signaling. The feedback control signaling may be signaling that has been transmitted based on modulating the encoded bits, e.g. based on an MCS scheme, and/or mapping of modulated symbols/bits in frequency domain and/or time domain, e.g. to subcarriers and/or symbols of resources scheduled or allocated for the feedback control signaling. Such resources may be scheduled e.g. with a scheduling assignment, and/or other control signaling, which may indicate which resources are to be used for feedback signaling pertaining to reception of signaling, which may be signaling indicated by the scheduling assignment. Signaling the feedback signaling pertains to may generally be communicating signaling and/or reference signaling, which the feedbacking radio node may be scheduled and/or configured and/or intended to receive. The code rate may for example be determined based on bandwidth for feedback control signaling and/or modulation scheme and/or number of information bits and/or encoding scheme and/or the code rate indication. Transmitting feedback control signaling may comprise determining the code rate, e.g., directly from the code rate indication, and/or calculating and/or estimating and/or reading it. However, transmitting feedback control signaling with the indicated code rate may be performed without explicitly determining the code rate. Thus, the code rate may be implicit to the feedback control signaling, e.g. represented by the ratio I/E and/or other parameters of the signaling. Generally, the code rate indication may be implicit or explicit. Configuring a feedbacking radio node with a code rate indication may be based on and/or comprise determining, implicitly or explicitly, the code rate. The indicated code rate may be an actual code rate, or an estimate or representation of an actual code rate, e.g. an upper or lower limit representation. Information bits I may be considered to be (en-)coded with a code rate R, if I/E=R, or I/E corresponds to a representation and/or estimate and/or upper or lower limiting representation or R.

The approaches described herein allow flexible adaption of feedback control signaling to operational conditions. For example, with an indication of a low code rate, a high level of reliability of the feedback control signaling may be achieved, for example a low block-error rate (BLER).

The code rate indication may generally indicate a bandwidth for the feedback signaling. The bandwidth may for example be indicated as, and/or may represent, a number of subcarriers and/or a number of resource blocks, e.g. physical or virtual resource blocks. A resource block may be considered to represent a number F of subcarriers in frequency domain, e.g. F=12. Alternatively, or additionally, a code rate indication may indicate a mapping between the number I of information bits and/or payload size (and/or the information bits), and a bandwidth and/or allocated bandwidth or frequency resources, which may be allocated/scheduled for the feedback control signaling.

It may be considered that the code rate indication may indicate one code rate of a set of code rates for a bandwidth. For example, the indication may indicate the number of coding bits, and/or the number of encoded bits, and/or the code rate implicitly or explicitly. The set of code rates may comprise a plurality of code rates, which may be code rates available or possible for the bandwidth. The set may be predefined and/or configured or configurable. For different coding schemes and/or number of information bits (or payload size) and/or different types of information for the feedback control signaling, different sets may be provided, e.g. configured and/or predefined.

In some variants, the code rate and/or the code rate indication may be determined (e.g., by the configuring radio node and/or the feedbacking radio node) based on a transmission mode or transmission mode representation, e.g. of signaling to which the feedback control signaling pertains, and/or may be indicated by a representation or indication thereof. A transmission mode or corresponding representation may be represented by, and/or pertain to one or more characteristics or parameters, e.g. the MCS to be used, e.g. in the context of link adaptation, and/or the targeted BLER, and/or Quality of Service, and/or priority, and/or urgency/latency, and/or the channel on which the feedback control signaling is to be transmitted (and/or the format of such a channel, e.g. PUCCH format), and/or the channel of signaling the feedback control signaling pertains to, e.g. provides feedback for, or is determined in response to receiving the channel or signaling. A transmission mode or its representation may for example indicate which uplink or sidelink channel the feedback control signaling is to be transmitted on, which in particular may be a physical control channel, e.g. a physical uplink control channel or a physical sidelink control channel. Examples of a physical uplink control channel comprise a PUCCH, a short PUCCH, a long PUCCH, a channel for carrying HARQ information, a control channel associated to URLLC communication, or similar. For sidelink, analogous channels may be considered. In another additional or alternative example, the transmission mode or its representation may indicate the type of feedback control information or signaling, e.g. whether it is acknowledgement signaling (e.g., ACK/NACK) or measurement reporting or scheduling request information or beam-related information. Alternatively, or additionally, a transmission mode or its representation may pertain to received signaling, and/or a channel of received signaling, the feedback control signaling pertains to (provides feedback for), e.g. reference signaling on a port or associated to a beam, or to a data channel, which may carry communication signaling, e.g. a dedicated or shared channel, which may be a physical channel like a physical downlink or sidelink shared channel like a PDSCH or PSSCH. The transmission mode may be indicated by the code rate indication. A transmission mode or its representation may pertain to one or more such characteristics or parameters for the feedback control signaling and/or signaling the feedback control signaling pertains to. There may generally be considered that one or more sets of code rates are provided (e.g., configured or configurable, and/or predefined) for one or more such transmission modes and/or characteristics. A code rate indication may indicate the set and/or the code rate from the set to be used for the feedback control signaling.

The code rate indication may indicate an anchor frequency resource structure and/or indicating a bandwidth, and/or a bandwidth location or distribution, for the feedback control signaling. A bandwidth may indicate a number of subcarriers and/or resource blocks. A bandwidth location and/or distribution may indicate where in frequency domain the subcarriers and/or resource blocks of the bandwidth are located. The code rate indication may configure the feedbacking radio node for mapping the information bits I, respectively the encoded bits E, to the bandwidth and/or the frequency location or distribution. A frequency distribution may be contiguous, or distributed in separated, non-neighbouring (in frequency domain) frequency intervals, e.g. subcarrier or subcarrier groupings or resource blocks. Non-contiguous frequency distributions may for example be used in the context of frequency hopping. An anchor frequency resource structure may indicate a resource structure indicating a location of a bandwidth or bandwidth distribution in frequency domain. An anchor frequency resource structure may for example be an anchor resource block, whose location may be indicated, and which indicates the location of one or more other resource blocks relative to the anchor resource block.

The code rate indication may indicate one of a plurality of code rates possible for a coding scheme. For each coding scheme (e.g., polar coding or LDPC or turbo coding or Reed-Mueller coding), there may be a set of code rates available, e.g. predefined and/or configured or configurable, which may be considered possible code rates. The set may comprise a plurality of rates. It may be considered that the code rate to be used may be indicated and/or indexed by the code rate indication. The coding scheme may generally be determined based on I, and/or the payload size of the feedback control signaling. The code rate may be determined and/or indicated based on the code rate indication and the coding scheme.

It may generally be considered that the code rate indication indicates one of a plurality of code rates possible for I information bits. A set of code rates for I information bits and/or based on the payload size may be configured or configurable or predefined, which may be considered the possible codes rates. The set may comprise a plurality of code rates. For each I, there may be defined a one set, or a plurality of sets, each of which may pertain to a different transmission mode, e.g. coding scheme.

A set of code rates may comprise a definite or indefinite number of code rates, and/or the number may be explicitly or implicitly limited. For example, if the code rate is indicated with a bandwidth indication, the possible number of code rates may be implicitly limited by the maximum bandwidth that may be indicated or allocated or scheduled. It should be noted that, generally, a set of code rates may be implicitly defined by the code rates allowable and/or available and/or indicatable and/or configurable. A set of code rates, or different sets, may be predefined and/or configured or configurable, e.g. by higher layer signaling, e.g. RRC signaling or MAC signaling. A set, or different sets, may be represented by or in one or more tables. A code rate indication may indicate a set out of different sets and/or a code rate out of the set, e.g. by indexing or referencing one or more tables.

A code rate may generally be indicated by, and/or be determined based on, a number L of (en)coding bits to be determined based on I information bits. The encoded bits may comprise E=L+I bits.

In some variants, the code rate indication may indicate and/or represent a target block error rate for the feedback control signaling.

Generally, the feedback control signaling may be associated to, e.g. represent or be formatted for or according to, a physical uplink control channel or a physical sidelink control channel. Signaling associated to information may generally be considered to carry and/or represent the information. Signaling or information associated to a channel may be transmitted on the channel and/or be mapped or mappable to the channel, e.g. according to resources it is transmitted on, and/or based on a channel format. Feedback control signaling or information pertaining to other signaling may be feedback to that signaling or the information thereof, e.g. acknowledgement signaling or measurement reporting. Such signaling or information may be determined based on, or in response to, receiving (or not receiving, or decoding or not decoding) the other signaling.

It may be considered that in general the feedback control signaling may represent uplink control information or sidelink control information, and/or may be associated to a corresponding channel. The feedback control signaling may pertain to received signaling, which may be in a direction of communication reverse or opposite to the direction it is transmitted in, e.g. feeding back information determined based on (pertaining to) the received signaling.

Receiving feedback control signaling based on the code rate and/or code rate indication may comprise decoding and/or demodulating received signaling assuming the code rate has been used for encoding it, or that it has been encoded according to the code rate indication. Such decoding may in particular assume a mapping of bits to resources and/or modulation symbols in line with the code rate or code rate indication.

Also, a program product comprising instructions causing processing circuitry to control and/or perform a method as described herein is disclosed.

A carrier medium arrangement carrying and/or storing a program product as described herein is also considered—

BRIEF DESCRIPTION OF THE DRAWINGS

The drawings are provided to illustrate concepts and approaches described herein, and are not intended to limit their scope. The drawings comprise.

DETAILED DESCRIPTION

In the following, approaches are illustrated with reference to NR RAN, in the context of feedback control signaling being associated to uplink control information (specifically, UCI according to NR) or associated signaling. UCI may comprise for example ACK/NACK, CQI/CSI, SR, beam-related parameters or any combination thereof.

NR defines a multitude of different PUCCH formats, among others a short and long PUCCH format that can carry more than 2 bits up to a few 10 bits and up to a few 100 bits, respectively. To be capable of supporting such large payload variations these two PUCCH formats have variable bandwidth depending on the UCI size.

Figure 1:
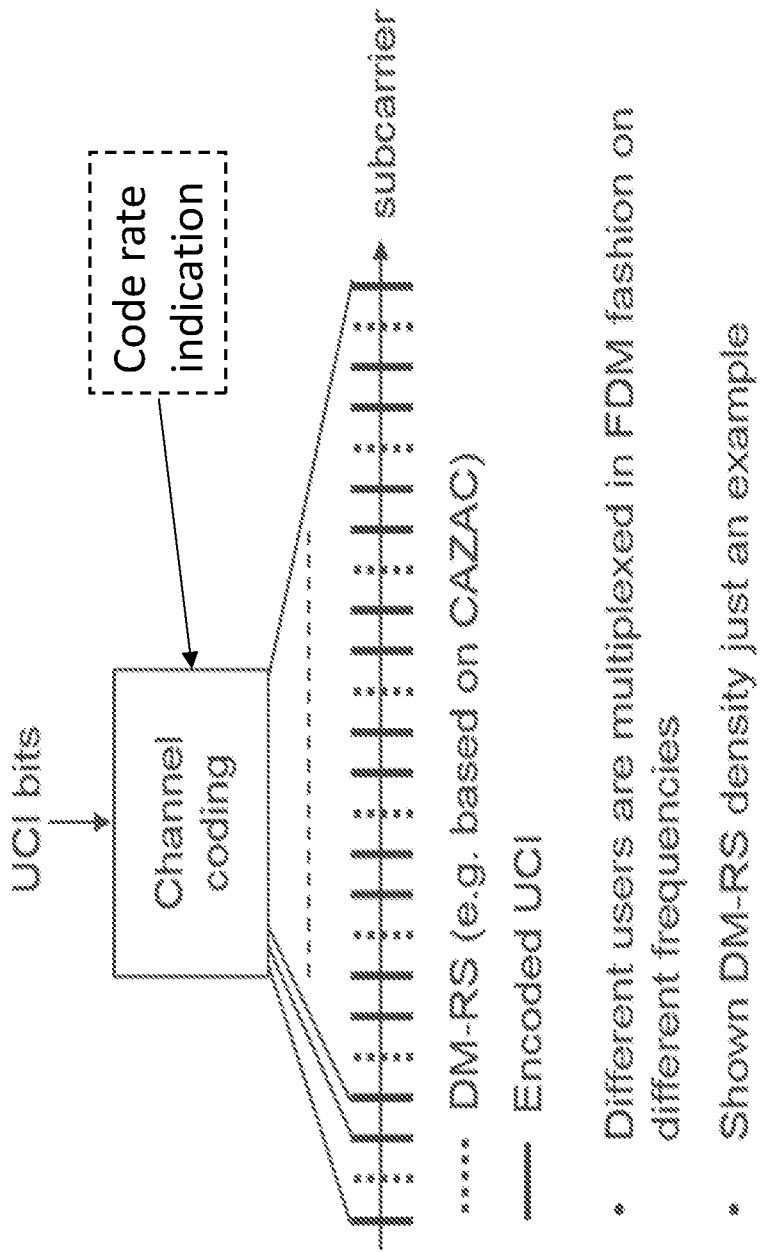
FIG. 1, schematically showing the encoding of a short PUCCH.

FIG. 1 shows a schematic representation of short PUCCH format for more than 2 bit (representing I). The UCI (ACK/NACK, CQI/CSI, SR, beam-related parameters and any combination thereof) is encoded, mapped to modulation symbols which are mapped to subcarriers of one OFDM symbol carrying UCI, e.g. as scheduled for UCI/PUCCH transmission. FDMed with the UCI-carrying subcarriers may be DM-RS to facilitate demodulation of the signaling. The number of allocated RBs (representing the bandwidth) is variable and may depend on the UCI size. A similar structure exists for a two symbol long short PUCCH. In particular, FIG. 1 shows a Short PUCCH format for more than 2 bit. The encoding may be based on a code rate indication, which may indicate which code rate to use.

Figure 2:
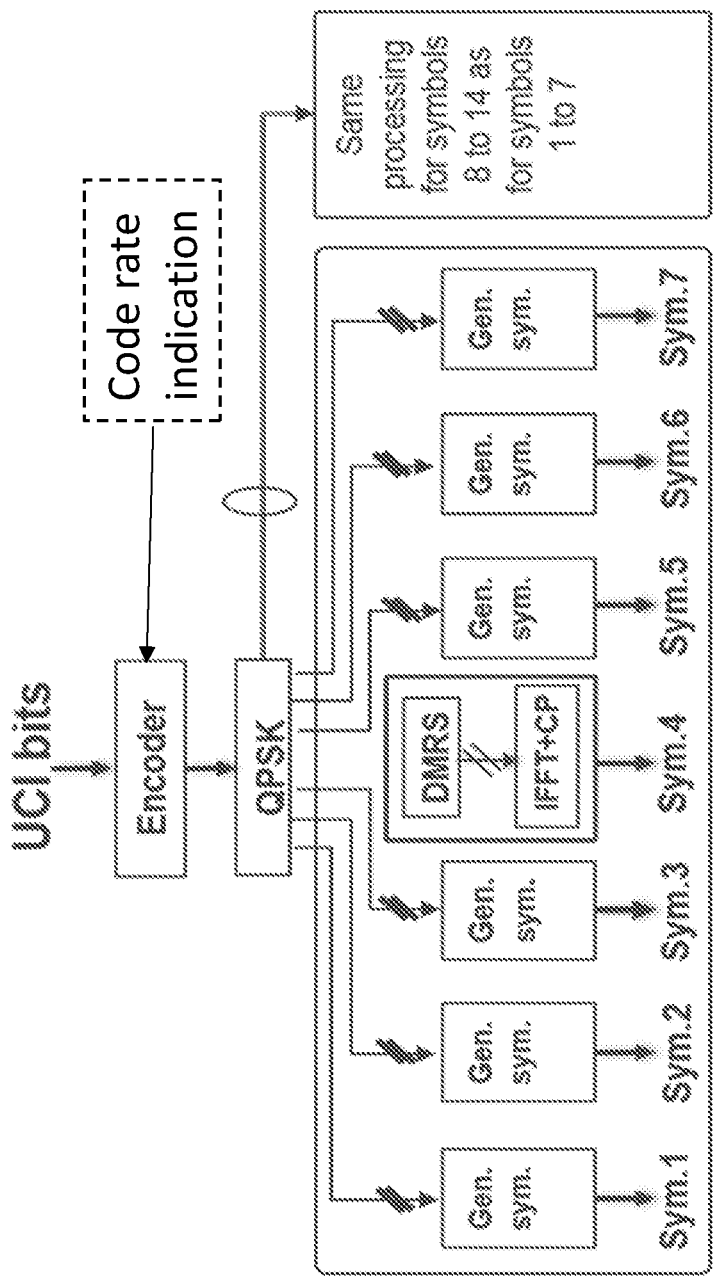
FIG. 2, schematically showing the encoding of a long PUCCH.

FIG. 2 shows a schematic representation of long PUCCH format for more than 2 bit. Long PUCCH comes with variable length (in time domain) ranging from 4 symbols to a complete slot and even multiple slots (or other transmission timing structures). The UCI (ACK/NACK, CQI/CSI, SR, beam-related parameters or any combination thereof) is encoded, e.g., based on a code rate indication, and mapped to modulation symbols. The modulation symbols are grouped into groups of modulation symbols (one group per OFDM symbol). DFT-precoding is applied to the symbols per group to obtain a low PAPR/CM. The DFT-spread modulation symbols are assigned to the allocated subcarriers and OFDM modulated. A harvest frequency diversity frequency hopping can be applied as shown in the figure. The number of allocated RBs is variable and depends on the UCI size. DM-RS are mapped to separate symbols to maintain low PAPR/CM. FIG. 2 in particular shows a long PUCCH format with 14 symbols for more than 2 bit.

With one fixed mapping between UCI size and number of allocated RB the code rate of the PUCCH is constant or varies only slightly, which may be not sufficient to support various use cases, among others MBB and URLLC. While the typical operating point of PUCCH for MBB is in the range of BLER=1E-2 . . . 1E-3, the required BLER can be substantially lower for URLLC. With an almost constant code rate for PUCCH, it is difficult to target very different BLER. The mapping between UCI size (payload size, or number I of information bits, and/or UCI bits), and bandwidth (represented by the number of allocated RBs) may be indicated by the code rate indication, which for example may indicate one code rate from a set of possible code rates to be used.

According to approaches described herein, e.g. as part of the PUCCH resource configuration, a target code rate of the PUCCH can be specified, e.g. utilising the code rate indication. This may result in different slopes of the UCI→#RB mapping. The network has good control over the PUCCH code rate and thus can easily adopt PUCCH reliability to the different NR usage scenarios, such as MBB and URLLC.

For example as part of the PUCCH configuration, a target code rate of the PUCCH is specified. The actual code rate can vary slightly since the number of coded bits is only incremented in sizes of (fractional) RB, while UCI can change with granularity of 1 bit. For example, as part of a PUCCH configuration a target code rate $R_{tar}$ can be configured. With #UCI UCI bits, #RB allocated RBs, #SC the number of subcarriers per RB (e.g., 12), #Symb UCI carrying symbols, and $Q_m$ the bits per modulation symbol (preferable fixed QPSK, i.e. Q_m=2) the actual code rate is $$R_{act} = \frac{\#UCI}{\#SC \cdot \#RB \cdot \#Symb \cdot (1 - OH_{DMRS}) \cdot Qm} \leq R_{tar}, \quad \text{(Equation 1)}$$

which should be smaller than the target code rate. The number of allocated RB becomes then $$\#RB = \left\lceil \frac{\#UCI}{R_{tar} \cdot \#Symb \cdot (1 - OH_{DMRS}) \cdot Qm} \right\rceil. \quad \text{(Equation 2)}$$

with $OH_{DMRS}$ indicating the DM-RS overhead averaged across the UCI-carrying symbols.

Another way to describe the same principle is to configure, as part of the PUCCH configuration for a nominal UCI size $\#UCI_{nom}$, the RB number $\#RB_{nom}$, needed to carry the UCI bits. If the actual UCI size #UCI is larger, additional RB need to be allocated. The total number of allocated RB can be expressed as $$\#RB = \left\lceil \frac{\#UCI}{\#UCI_{nom}} \right\rceil \cdot \#PRB_{nom}, \quad \text{(Equation 3)}$$

if $RB_{nom}=1$ above formula simplifies to #RB=⌈#UCI/$\#UCI_{nom}$⌉.

The PUCCH time-frequency resources (allocated or scheduled resources) may be specified with RRC signaling or dynamic DCI signaling or a combination of both. RRC signaling may configures a set of PUCCH resources (PUCCH resource pool), wherein the DCI may select (indicate) one of the configured resources. Other alternatives such that the PUCCH resource is implicitly derived from another signal parameters are also considered.

In case of a multi-RB PUCCH, the so obtained time-frequency resource (RB) may be complemented with as many RB as needed to obtain #RB RB in total. Often, the resources in PUCCH resource pool (and also if derived implicitly from another parameter) will be only 1 RB wide, even though other values can be envisioned as well. Assuming the PUCCH resource pool provides 1 RB, this RB can be seen as the anchor RB of the PUCCH and #RB-1 additional RBs may be added to obtain the desired PUCCH bandwidth of #RB RB. The anchor RB can be the lowest, a defined middle, or the highest RB in bandwidth of the PUCCH. The anchor RB is then complemented with the remaining RBs either in a contiguous or non-contiguous fashion, e.g. according to a predefined and/or configured or configurable (bandwidth) distribution.

Figure 3:
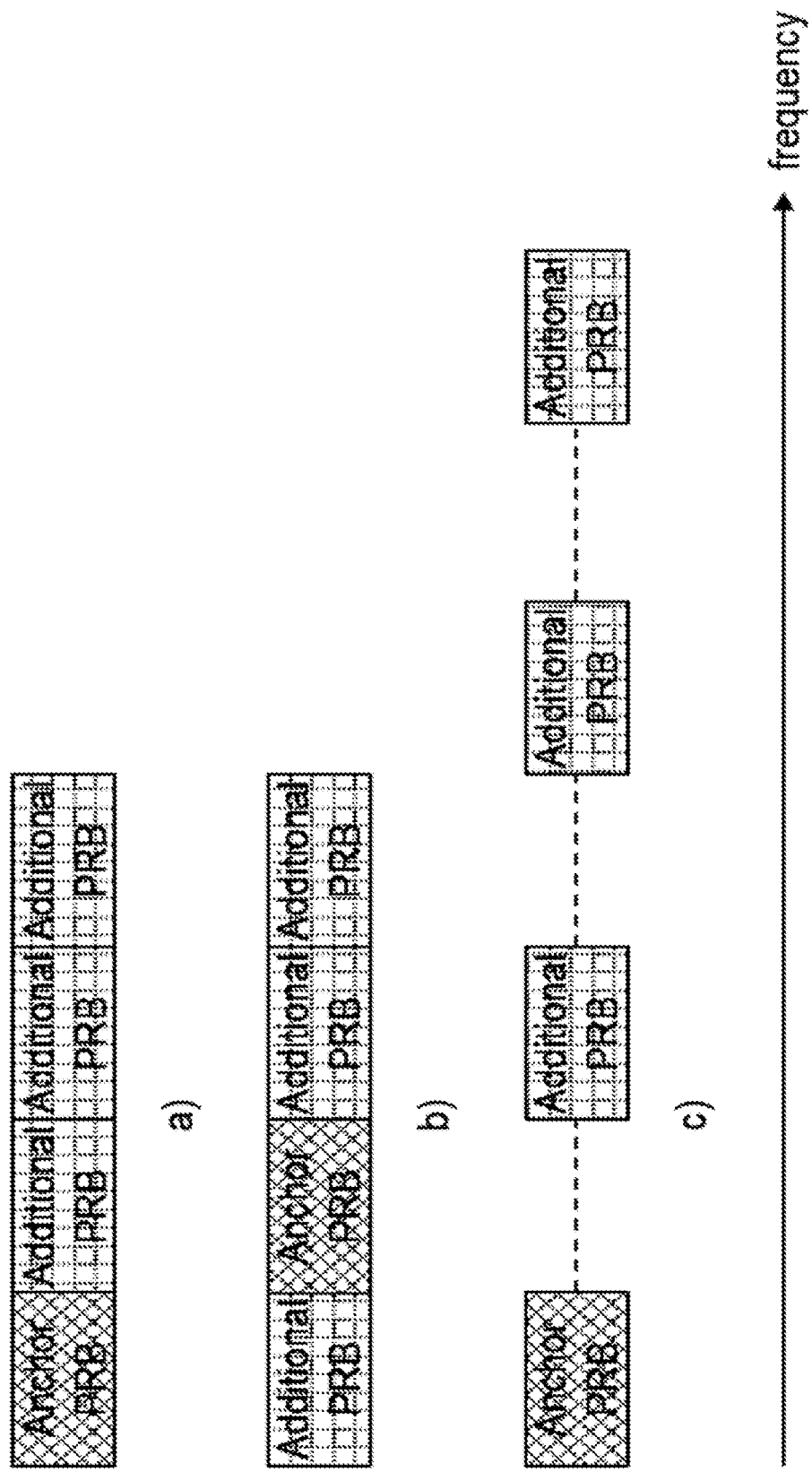
FIG. 3, schematically showing different arrangements of an anchor RB.

FIG. 3 shows different examples how a 1 RB wide anchor RB is complemented by 3 RB to obtain #RB=4 total RBs. In a) the anchor RB is the lowest RB in frequency and contiguously extended to higher frequencies; in b) the PUCCH resource is also contiguous, but the anchor RB is a defined RB in the middle; and in c) the PUCCH resource consists of 4 non-contiguous RB with the anchor RB the lowest one.

Instead of directly configuring the code rate together with a PUCCH resource (alternatively nominal UCI and RB size) one or more tables with different profiles may be considered, e.g. for low, medium, and high PUCCH reliability, wherein different profiles may map to different code rates, see for example table 1. The profiles may optionally be mapped or indexed to different bandwidth distributions. A code rate indication may indicate or index the profile and/or bandwidth distribution, and/or configure the table/s.

TABLE 1

Three different PUCCH reliability profiles are specified.

| PUCCH reliability profile | Contiguous RB allocation | Non-contiguous RB allocation |
|---|---|---|
| Low | $R_{tar,1}$ | $R_{tar,4}$ |
| Medium | $R_{tar,2}$ | $R_{tar,5}$ |
| High | $R_{tar,3}$ | $R_{tar,6}$ |

If for a PUCCH both contiguous and non-contiguous RB allocations are specified, the table could have two different sets of code rates, one for contiguous and one for non-contiguous RB allocations. The code rates for the non-contiguous RB allocation may be set higher than the corresponding ones from the contiguous RB allocation, since the non-contiguous RB allocation enjoys more frequency diversity. For example, for the code rates $R_{tar,1} \geq R_{tar,2} \geq R_{tar,3}$ and $R_{tar,4} \geq R_{tar,5} \geq R_{tar,6}$ may hold.

Different UCI encoders (representing coding schemes) depending on the UCI payload may be used. For example, Reed-Muller codes may be used for up to 11 UCI bits (information bits), while Polar codes may be used for larger UCI sizes. The encoders have different error protection capabilities. Instead of a single code rate, a code rate as function of encoder could be defined, or more generally the code rate could be defined as function of the UCI size (since even for one encoder the coding gain depends on the information block size).

A PUCCH resource can be used for transportation of different UCI types (ACK/NACK, CQI/CSI, SR, beam-related parameters and any combination thereof). Depending on the UCI type or the UCI type mix (combination of types) that is transmitted in a PUCCH transmission (feedback control signaling), different code rates could be configured or indicated. ACK/NACK typically has higher performance requirements than CQI/CSI, so a lower code rate could be configured for PUCCH containing ACK/NACK than PUCCH containing CQI/CSI.

TABLE 2

Depending on the PUCCH payload, different code rates are configured, representing a set of code rates

| UCI type | Target code rate |
|---|---|
| UCI type 1 | $R_{tar,1}$ |
| UCI type 2 | $R_{tar,2}$ |
| UCI type 3 | $R_{tar,3}$ |
| UCI mix 1 | $R_{tar,4}$ |
| UCI mix 2 | $R_{tar,5}$ |

A UCI mix could be just defined by which UCI types are mixed (e.g. ACK/NACK and CQI/CSI) or could depend both on the mixed UCI types, but also on the sizes or fraction of sizes of the mixed UCI types. Accordingly, the set of code rates could be depended on the information type and/or the payload size.

A PUCCH could be transmitted in response to a downlink transmission associated with certain QoS requirements, such as BLER and/or priority and/or latency. If the downlink transmission requires high reliability, high reliability for the HARQ feedback may be required as well. Thus, the reliability and code rate associated with the corresponding PUCCH transmission can depend on QoS requirements of the downlink transmission. When configuring the PUCCH resource, a table can be configured that maps DL QoS requirements to PUCCH target code rates or to PUCCH target BLER, which can then be mapped to PUCCH target code rates. The DL QoS requirements could be known to the UE based on bit field in the DCI message that indicates a DL transmission profile. Each transmission profile would then map to PUCCH reliability requirements. It could be further considered that the PUCCH reliability requirements are derived based on the properties of the PDSCH. The PDSCH properties could be on or a combination of code rate, modulation order, time domain allocation, frequency domain allocation, numerology, cyclic prefix, TBS size, waveform, carrier, bandwidth part, number of layers, QCL information and potentially together with other properties not listed here. These characteristics described here may be considered transmission mode characteristics.

A PUCCH resource for PUCCH formats that support variable bandwidth (number of RB) can be configured with a target code rate. The target code rate determines how fast/slow the PUCCH bandwidth grows as function of the UCI size. If a high target code rate is specified, the required number of PUCCH RB grows slower than if a low code rate is configured. Via the configured target code rate the e/gNB has control over the PUCCH reliability which is needed to support different use cases such as MBB or URLLC.

Figure 4:
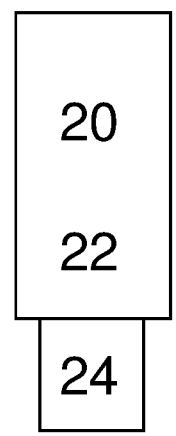
FIG. 4, schematically showing an exemplary radio node implemented as user equipment.

FIG. 4 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 5:
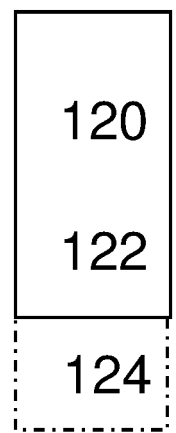
FIG. 5, schematically showing an exemplary radio node implemented as network node.

FIG. 5 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling.

However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of uplink control information or signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

A sidelink may generally represent a communication channel (or channel structure) between two UEs and/or terminals, in which data is transmitted between the participants (UEs and/or terminals) via the communication channel, e.g. directly and/or without being relayed via a network node. A sidelink may be established only and/or directly via air interface/s of the participant, which may be directly linked via the sidelink communication channel. In some variants, sidelink communication may be performed without interaction by a network node, e.g. on fixedly defined resources and/or on resources negotiated between the participants. Alternatively, or additionally, it may be considered that a network node provides some control functionality, e.g. by configuring resources, in particular one or more resource pool/s, for sidelink communication, and/or monitoring a sidelink, e.g. for charging purposes.

Sidelink communication may also be referred to as device-to-device (D2D) communication, and/or in some cases as ProSe (Proximity Services) communication, e.g. in the context of LTE. A sidelink may be implemented in the context of V2×communication (Vehicular communication), e.g. V2V (Vehicle-to-Vehicle), V2I (Vehicle-to-Infrastructure) and/or V2P (Vehicle-to-Person). Any device adapted for sidelink communication may be considered a user equipment or terminal.

A sidelink communication channel (or structure) may comprise one or more (e.g., physical or logical) channels, e.g. a PSCCH (Physical Sidelink Control CHannel, which may for example carry control information like an acknowledgement position indication, and/or a PSSCH (Physical Sidelink Shared CHannel, which for example may carry data and/or acknowledgement signaling). It may be considered that a sidelink communication channel (or structure) pertains to and/or used one or more carrier/s and/or frequency range/s associated to, and/or being used by, cellular communication, e.g. according to a specific license and/or standard. Participants may share a (physical) channel and/or resources, in particular in frequency domain and/or related to a frequency resource like a carrier) of a sidelink, such that two or more participants transmit thereon, e.g. simultaneously, and/or time-shifted, and/or there may be associated specific channels and/or resources to specific participants, so that for example only one participant transmits on a specific channel or on a specific resource or specific resources, e.g., in frequency domain and/or related to one or more carriers or subcarriers.

A sidelink may comply with, and/or be implemented according to, a specific standard, e.g. a LTE-based standard and/or NR. A sidelink may utilise TDD (Time Division Duplex) and/or FDD (Frequency Division Duplex) technology, e.g. as configured by a network node, and/or preconfigured and/or negotiated between the participants. A user equipment may be considered to be adapted for sidelink communication if it, and/or its radio circuitry and/or processing circuitry, is adapted for utilising a sidelink, e.g. on one or more frequency ranges and/or carriers and/or in one or more formats, in particular according to a specific standard. It may be generally considered that a Radio Access Network is defined by two participants of a sidelink communication. Alternatively, or additionally, a Radio Access Network may be represented, and/or defined with, and/or be related to a network node and/or communication with such a node.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

In the context of this disclosure, there may be distinguished between dynamically scheduled or aperiodic transmission and/or configuration, and semi-static or semi-persistent or periodic transmission and/or configuration. The term "dynamic" or similar terms may generally pertain to configuration/transmission valid and/or scheduled and/or configured for (relatively) short timescales and/or a (e.g., predefined and/or configured and/or limited and/or definite) number of occurrences and/or transmission timing structures, e.g. one or more transmission timing structures like slots or slot aggregations, and/or for one or more (e.g., specific number) of transmission/occurrences. Dynamic configuration may be based on low-level signaling, e.g. control signaling on the physical layer and/or MAC layer, in particular in the form of DCI or SCI. Periodic/semi-static may pertain to longer timescales, e.g. several slots and/or more than one frame, and/or a non-defined number of occurrences, e.g., until a dynamic configuration contradicts, or until a new periodic configuration arrives.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Feedback signaling may be considered a form or control signaling, e.g. uplink or sidelink control signaling, like UCI (Uplink Control Information) signaling or SCI (Sidelink Control Information) signaling. Feedback signaling may in particular comprise and/or represent acknowledgement signaling and/or acknowledgement information and/or measurement reporting.

Acknowledgement information may comprise an indication of a specific value or state for an acknowledgement signaling process, e.g. ACK or NACK or DTX. Such an indication may for example represent a bit or bit value or bit pattern or an information switch. Different levels of acknowledgement information, e.g. providing differentiated information about quality of reception and/or error position in received data element/s may be considered and/or represented by control signaling. Acknowledgment information may generally indicate acknowledgment or non-acknowledgment or non-reception or different levels thereof, e.g. representing ACK or NACK or DTX. Acknowledgment information may pertain to one acknowledgement signaling process. Acknowledgement signaling may comprise acknowledgement information pertaining to one or more acknowledgement signaling processes, in particular one or more HARQ or ARQ processes. It may be considered that to each acknowledgment signaling process the acknowledgement information pertains to, a specific number of bits of the information size of the control signaling is assigned. Measurement reporting signaling may comprise measurement information.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

Different formats of for control information may be considered, e.g. different formats for a control channel like a Physical Uplink Control Channel (PUCCH). PUCCH may carry control information or corresponding control signaling, e.g. Uplink Control Information (UCI). UCI may comprise feedback signaling, and/or acknowledgement signaling like HARQ feedback (ACK/NACK), and/or measurement information signaling, e.g. comprising Channel Quality Information (CQI), and/or Scheduling Request (SR) signaling. One of the supported PUCCH formats may be short, and may e.g. occur at the end of a slot interval, and/or multiplexed and/or neighboring to PUSCH. Similar control information may be provided on a sidelink, e.g. as Sidelink Control Information (SCI), in particular on a (physical) sidelink control channel, like a (P)SCCH.

A code block may be considered a subelement of a data element like a transport block, e.g., a transport block may comprise a one or a plurality of code blocks.

A scheduling assignment may be configured with control signaling, e.g. downlink control signaling or sidelink control signaling. Such controls signaling may be considered to represent and/or comprise scheduling signaling, which may indicate scheduling information. A scheduling assignment may be considered scheduling information indicating scheduling of signaling/transmission of signaling, in particular pertaining to signaling received or to be received by the device configured with the scheduling assignment. It may be considered that a scheduling assignment may indicate data (e.g., data block or element and/or channel and/or data stream) and/or an (associated) acknowledgement signaling process and/or resource/s on which the data (or, in some cases, reference signaling) is to be received and/or indicate resource/s for associated feedback signaling, and/or a feedback resource range on which associated feedback signaling is to be transmitted. Transmission associated to an acknowledgement signaling process, and/or the associated resources or resource structure, may be configured and/or scheduled, for example by a scheduling assignment. Different scheduling assignments may be associated to different acknowledgement signaling processes. A scheduling assignment may be considered an example of downlink control information or signaling, e.g. if transmitted by a network node and/or provided on downlink (or sidelink control information if transmitted using a sidelink and/or by a user equipment).

A scheduling grant (e.g., uplink grant) may represent control signaling (e.g., downlink control information/signaling). It may be considered that a scheduling grant configures the signaling resource range and/or resources for uplink (or sidelink) signaling, in particular uplink control signaling and/or feedback signaling, e.g. acknowledgement signaling. Configuring the signaling resource range and/or resources may comprise configuring or scheduling it for transmission by the configured radio node. A scheduling grant may indicate a channel and/or possible channels to be used/usable for the feedback signaling, in particular whether a shared channel like a PUSCH may be used/is to be used. A scheduling grant may generally indicate uplink resource/s and/or an uplink channel and/or a format for control information pertaining to associated scheduling assignments. Both grant and assignment/s may be considered (downlink or sidelink) control information, and/or be associated to, and/or transmitted with, different messages.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat reQuest |
| CAZAC | Constant Amplitude Zero Cross Correlation |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(—)RS | Demodulation reference signal(ing) |
| FDM | Frequency Division Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RB | Resource Block |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDM | Time Division Multiplex |

-continued

| Abbreviation | Explanation |
|---|---|
| UCI | Uplink Control Information |
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating a user equipment in a radio access network, the method comprising;
receiving a code rate indication, the code rate indication indicating a bandwidth for feedback signaling where the bandwidth maps to a predetermined code rate, the code rate indication further indicating one code rate of a set of code rates corresponding to the indicated bandwidth; and
transmitting feedback control signaling, the feedback control signaling representing a number I of information bits, the I information bits being encoded with the predetermined code rate based on the code rate indication.

2. The method according to claim 1, wherein at least one of the predetermined code rate and the code rate indication is determined based on at least one of a transmission mode and a representation thereof.

3. The method according to claim 1, wherein the code rate indication at least one of:
indicates an anchor frequency resource structure;
indicates a bandwidth; and
indicates one of a bandwidth location and distribution, for the feedback control signaling.

4. The method according to claim 1, wherein the code rate indication indicates one of a plurality of code rates possible for a coding scheme.

5. The method according to claim 1, wherein the code rate indication indicates one of a plurality of code rates possible for I information bits.

6. The method according to claim 1, wherein the predetermined code rate is indicated by a number L of coding bits to be determined based on I information bits.

7. The method according to claim 1 wherein the code rate indication at least one of indicates and represents a target block error rate for the feedback control signaling.

8. The method according to claim 1, wherein the feedback control signaling is associated with one of a physical uplink control channel and a physical sidelink control channel.

9. The method according to claim 1, wherein the feedback control signaling represents uplink control information or sidelink control information.

10. A user equipment for a radio access network, the user equipment being configured to:
receive a code rate indication, the code rate indication indicating a bandwidth for feedback signaling where the bandwidth maps to the predetermined code rate, the code rate indication further indicating one code rate of a set of code rates corresponding to the indicated bandwidth; and
transmit feedback control signaling, the feedback control signaling representing a number I of information bits, the I information bits being encoded with the predetermined code rate based on the code rate indication.

11. A method of operating a configuring radio node in a radio access network, the method comprising causing transmission of a code rate indication for configuring a user equipment for feedback control signaling, the code rate indication indicating one code rate of a set of code rates corresponding to an indicated bandwidth, the indicated code rate for encoding information bits of the feedback control signaling.

12. The method according to claim 11, wherein at least one of the predetermined code rate and the code rate indication is determined based on at least one of a transmission mode and a representation thereof.

13. The method according to claim 11, wherein the code rate indication at least one of:
indicates an anchor frequency resource structure;
indicates a bandwidth; and
indicates one of a bandwidth location and distribution, for the feedback control signaling.

14. The method according to claim 11, wherein the code rate indication indicates one of a plurality of code rates possible for a coding scheme.

15. The method according to claim 11, wherein the code rate indication indicates one of a plurality of code rates possible for I information bits.

16. The method according to claim 11, wherein a code rate is indicated by a number L of coding bits to be determined based on I information bits.

17. A configuring radio node for a radio access network, the configuring radio node being configured to cause transmission of a code rate indication for configuring a user equipment for feedback control signaling, the code rate indication indicating one code rate of a set of code rates corresponding to an indicated bandwidth, the indicated code rate for encoding information bits of the feedback control signaling.

18. A non-transitory computer storage medium storing an executable computer program comprising instructions that, when executed, cause processing circuitry to at least one of control and perform a method of operating a user equipment in a radio access network, the method comprising:
receiving a code rate indication, the code rate indication indicating a bandwidth for feedback signaling where the bandwidth maps to a predetermined code rate, the code rate indication indicating one code rate of a set of code rates corresponding to the indicated bandwidth; and
transmitting feedback control signaling, the feedback control signaling representing a number I of information bits, the I information bits being encoded with the predetermined code rate based on the code rate indication.

* * * * *